United States Patent Office 2,839,410
Patented June 17, 1958

2,839,410
METHOD FOR PRESERVING FISH

Öyvind Helgerud, Oslo, and Alf Olsen, Fagertun per Drammen, Norway, assignors to A/S Protan, Drammen, and Öyvind Helgerud, Oslo, Norway No Drawing. Application June 21, 1955
Serial No. 517,058

Claims priority, application Norway July 5, 1954

1 Claim. (Cl. 99—195)

For keeping food, particularly small fish like brisling, sardines, prawns and shrimps etc. in fresh condition during shorter or longer periods prior to their preparation in the preserving factories there has hitherto been no suitable method. As the catch of this kind of fish is seasonal, large quantities of brisling accumulate in the nets because there are no suitable methods for keeping the fish fresh until it can be accepted by the factory. It is, therefore, necessary to keep the fish in the nets over prolonged periods, causing large losses of fish while preventing the nets from being used for further catches.

Attempts to keep the catch by refrigerated storage have failed, as it easily becomes rancid and dries through evaporation of water. The storage in frozen condition can thus extend to a maximum of 6 weeks only. After thawing the rejects are very considerable, up to 15-20%.

If a method can be found for preventing rancidity and drying, making such raw materials keep fresh over prolonged periods, it will be of the greatest importance for the utilisation of the catch as well as giving a prolonged operating period for the factories.

Utilising the method according to Norwegian Patent No. 83,705 the said raw materials can certainly be kept fresh over prolonged periods, even from season to season, but the method has not shown to be particularly useful for the treatment of raw materials for the preserving factories. When the frozen mass is thawed the jelly does not melt so that the fish must be plucked out singly, which industrially is impractical and uneconomic. The frozen fish is very brittle and will stand careful handling only.

The present invention provides a method enabling food, particularly small fish, shrimps and the like, to be stored in great quantities and over prolonged periods, the difficulties of the removal of the protecting means being avoided.

The method according to the invention consists in deep freezing the food in a thickened salt solution, the content of salt being sufficient to make the thawing temperature of the frozen solution lower than the thawing temperature of the frozen food, preferably below about $-2°$ C. (28.4° F.). The characteristic feature of the preparation of this solution is the addition of a thickener in such a quantity that the viscosity of the solution at room temperature can reach 3000 cps.

The use of such viscous solutions, forming no irreversible gel, results in the frozen food, when thawing, remaining frozen stiff when the solution is already liquid. The solution can then be removed quickly and effectively and the frozen product can then by washing easily be freed from adhering solution prior to further treatment.

The utilisation of the relevant viscous solutions prevents further the salt content of the solution from wandering into the food during the freezing, which takes some time; this would result in an increasing salt concentration towards the center of the block, which might be injurious for the food.

The method has the further advantage that the food to be frozen can be laid in a comparatively simple packing, cardboard boxes or the like, which need not be very tight or watertight, the food being drenched with the solution, which due to its viscosity is unable to drain out of any small openings.

When carrying out the method according to the invention the liquid used consists in a salt solution to which is added a thickener. As thickeners are used preferably cold soluble hydrocolloids such as alginate, carrageenin, carboxymethyl cellulose, carob bean flour, agar, polyvinylalcohol or mixtures of these. As salts are used preferably sodium chloride, phosphates, sulphates or mixtures of such.

The following examples of the constitution of such solutions can be given:

1

| | Percent |
|---|---|
| Sodium alginate (preferably a highly polymerised sodium alginate with viscosity 50 cps. in 0.3% solution) | 1.5 |
| Sodium hexa meta phosphate | 3.0 |
| Sodium chloride | 1.0 |
| Water | 94.5 |
| | 100 |

This solution has a viscosity at 20° C. of about 1100 cps., pH 5.5 and thawing temperature of $-3°$ C.

2

| | Percent |
|---|---|
| Carob bean flour | 3.5 |
| Sodium chloride | 2.5 |
| Water | 94.0 |
| | 100 |

This solution has a viscosity at 20° C. of about 900 cps., pH 9.5 and thawing temperatre of $-2.5°$ C.

3

| | Percent |
|---|---|
| Carboxymethyl cellulose | 4.0 |
| Sodium chloride | 2.5 |
| Water | 93.5 |
| | 100 |

This solution has a viscosity at 20° C. of about 900 cps., pH about 6.5 and thawing temperature of $-3°$ C.

4

| | Percent |
|---|---|
| Carrageenin | 1.5 |
| Sodium chloride | 1 |
| Sodium hexa meta phosphate | 2 |
| Water | 95.5 |
| | 100 |

This solution has a viscosity at 20° C. of about 1200 cps., pH about 5 and thawing temperature of $-2.5°$ C.

When carrying the invention into effect in a way given as example of freezing brisling a box is lined with parchment paper, filled with a suitable quantity of brisling and to each 20 liters brisling 5 liters of one of the above solutions is added, whereupon the whole is frozen. Such boxes can then be stored until they can be thawed in the preserving factory and the contents treated further.

When preserving small fish, brisling etc. the method gives the advantages that the quality of the raw material after prolonged storage and transport even in the summer is like that of fresh fish and that larger quantities of brisling can be utilised, as the capacity of the factory can be increased by the capacity of the freezing storage mak-

We claim:

The method of preserving fish and other marine animals comprising adding a water soluble hydrocolloid selected from the group consisting of sodium alginate, carrageenin, carboxymethyl cellulose, carob bean flour, agar, polyvinylalcohol and mixtures of these, in an amount of about 1.5% to about 4% to an aqueous salt solution having a concentration of about 2.5% to 4%, said solution containing a salt selected from the group consisting of sodium chloride, sodium hexametaphosphate, sodium sulfate and mixtures of these, whereby said hydrocolloid thickens said salt solution to a viscosity of up to about 3000 centipoises at room temperature, and block freezing said fish and other marine animals in said thickened solution of salt and water soluble hydrocolloid, said combination of salt and hydrocolloid producing a thawing temperature of said frozen block of fish of about −2 to about −3° C.

References Cited in the file of this patent

UNITED STATES PATENTS

| | | |
|---|---|---|
| 2,567,085 | Stoloff | Sept. 4, 1951 |
| 2,616,811 | Kjorstad | Nov. 4, 1952 |
| 2,763,557 | Helgerud et al. | Sept. 18, 1956 |

OTHER REFERENCES

"Food Technology," June 1951, pages 254 to 260, inclusive, article entitled Commercial Processing of Frozen Fish with Ascorbic Acid.

"Food Engineering," August 1955, page 165, article entitled Alginate-Jelly Mixture Protects Fatty Fish.